(12) United States Patent
Roth et al.

(10) Patent No.: US 7,255,492 B2
(45) Date of Patent: Aug. 14, 2007

(54) ELECTRO-OPTIC SURFACE MOUNT LIGHT PIPE AND CONNECTOR

(75) Inventors: Weston C. Roth, Portland, OR (US);
Damion T. Searls, Hillsboro, OR (US);
Thomas O. Morgan, Hillsboro, OR (US); James D. Jackson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 10/909,746

(22) Filed: Aug. 2, 2004

(65) Prior Publication Data
US 2006/0024002 A1    Feb. 2, 2006

(51) Int. Cl.
*G02B 6/36* (2006.01)
*G02B 6/38* (2006.01)

(52) U.S. Cl. ............................. 385/88; 385/89; 385/70; 385/71

(58) Field of Classification Search ................... 385/89
See application file for complete search history.

(56) References Cited

U.S. PATENT DOCUMENTS

| | | | | |
|---|---|---|---|---|
| 4,148,554 | A | * | 4/1979 | Magnusson et al. ........... 385/85 |
| 6,164,837 | A | * | 12/2000 | Haake et al. .................. 385/90 |
| 6,332,720 | B1 | * | 12/2001 | Shimaoka et al. ............. 385/88 |
| 6,398,424 | B1 | * | 6/2002 | Jin et al. ....................... 385/83 |
| 6,478,625 | B2 | * | 11/2002 | Tolmie et al. ............... 439/608 |
| 6,541,919 | B1 | * | 4/2003 | Roach et al. ............. 315/169.3 |
| 6,572,743 | B2 | * | 6/2003 | Miller et al. ........... 204/297.06 |
| 6,932,516 | B2 | * | 8/2005 | Ouchi et al. .................. 385/88 |
| 2002/0025122 | A1 | * | 2/2002 | Ouchi et al. .................. 385/88 |

\* cited by examiner

*Primary Examiner*—Frank G. Font
*Assistant Examiner*—Mary El-Shammaa
(74) *Attorney, Agent, or Firm*—Buckley, Maschoff & Talwalkar LLC

(57) ABSTRACT

A method includes providing a light pipe having a metallized end surface, and soldering the metallized end surface of the light pipe to a surface of a substrate. Other embodiments are described and claimed.

7 Claims, 4 Drawing Sheets

ELECTRO-OPTIC SURFACE MOUNT LIGHT PIPE AND CONNECTOR

BACKGROUND

As information technology devices continue to evolve and advance, there is a need for increased signaling speed rates for signaling between devices on circuit boards and/or between circuit boards. It has been proposed to satisfy this need with optical signal paths. However, conventional techniques for mounting light pipes on circuit boards tend to disrupt or interfere with traces, power planes, etc. on the circuit boards. Moreover, there is in general a need for improved methods of mounting light pipes on circuit boards.

DETAILED DESCRIPTION

Figure 1:
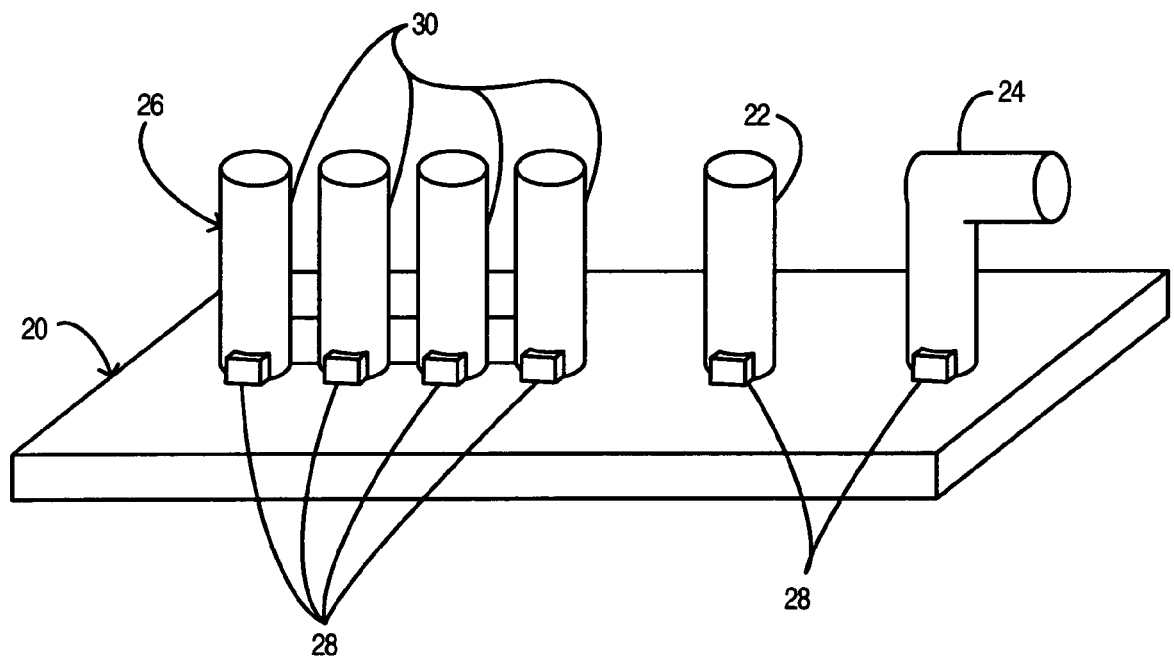
FIG. 1 is a schematic isometric view of a circuit board having light pipes mounted thereon in accordance with some embodiments.

FIG. 1 is a schematic isometric view of a circuit board 20, which has light pipes 22 and 24 and light pipe assembly 26 mounted thereon. In accordance with some embodiments, the light pipes 22 and 24 and the light pipe assembly 26 are mounted on the circuit board 20 by a surface mount technology (SMT) technique.

The circuit board 20 also has mounted on it a plurality of optical devices 28, each of which is optically coupled to a respective one of the light pipes 22, 24 or to a light pipe 30 that is part of the light pipe assembly 26. As used herein and in the appended claims, "optical device" refers to a light emitting diode, a laser diode, a photodiode or any other device that emits light or responds to receiving light. As used herein and in the appended claims, "light pipe" refers to a body of plastic that is substantially transparent to light or near optical (infrared, ultraviolet) radiation.

In some embodiments, one or more of the light pipes or the light pipe assembly may be omitted; also or alternatively, the circuit board may have other components (not shown) mounted thereon, including other light pipes or light pipe assemblies and/or integrated circuits, optical devices, discrete electrical components, etc., in addition to the components shown in FIG. 1. Moreover, the circuit board may have conductive traces and the like formed thereon, although not shown to simplify the drawing.

Figure 2:
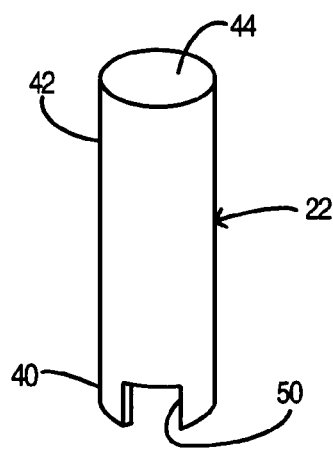
FIG. 2 is an isometric view of one of the light pipes shown in FIG. 1.

FIG. 2 is an isometric view in isolation of the light pipe 22 shown in FIG. 1 mounted on circuit board 20. Light pipe 22 is in the form of a generally cylindrical body and may be formed of a polycarbonate, cyclic olefin polymer, or any other plastic or other material which is both capable of transmitting and/or guiding optical and/or near optical (e.g., infrared, ultraviolet) radiation and is sufficiently heat resistant to withstand being soldered to the circuit board 20.

Figure 3:
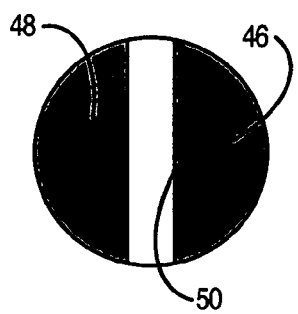
FIG. 3 is an inverted plan view of the light pipe of FIG. 2.
Figure 4:
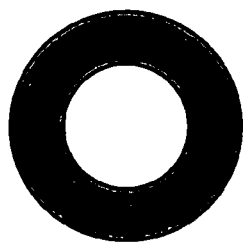
FIGS. 4-8 are views similar to FIG. 3 of alternative embodiments of the light pipe of FIG. 2.
Figure 5:
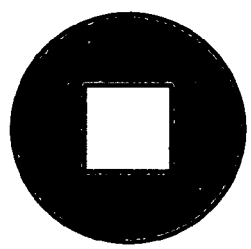
Figure 6:
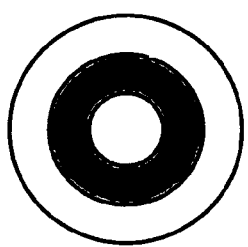
Figure 7:
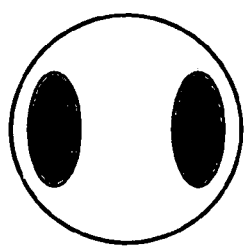
Figure 8:
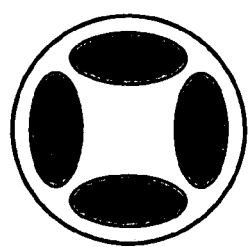

Light pipe 22 has a lower end 40 by which the light pipe 22 is to be mounted to the circuit board 20 and an outer end 42 which is opposite to the lower end 40. As seen from FIG. 2, the outer end 42 of the light pipe 22 may have a substantially circular end surface 44. FIG. 3 is an inverted plan view showing end surfaces 46, 48 of the lower end 40 (FIG. 2) of the light pipe 22. As seen from both FIGS. 2 and 3, the lower end 40 of the light pipe 22 has a notch 50 formed therein. The notch 50 separates the lower end surfaces 46, 48 from each other. A purpose of the notch 50 is to accommodate an optical device 28 (FIG. 1, not shown in FIGS. 2 and 3) to be optically coupled to the light pipe 22. It is to be understood that light emitted by an optical device accommodated by the notch 50 may exit from the light pipe 22 via the outer end surface 44; alternatively, light which enters the light pipe 22 via the outer end surface 44 may be received by an optical device accommodated by the notch 50.

The lower end surfaces 46, 48 of the light pipe 22 may be metallized (as indicated by shading in FIG. 3) to allow the lower end 40 to be mounted by soldering to the circuit board 20. In some embodiments the metal surface finish of the surfaces 46, 48 may be HASL (hot air solder layer), OSP (organic solderability preservative) or other solder-wettable finish. The metallization of the end surface of the lower end 40 may be performed, before the formation of the notch 50, by a process such as physical vapor deposition (e.g., electron beam or hot filament metal evaporation and deposition, or sputtering) or chemical vapor deposition (CVD). It is noted that if CVD is employed, there may be issues of compatibility between the chemical vapor and the plastic material of the light pipe 22. After the metallization of the end surface of the lower end 40 of the light pipe 22 is complete, the notch 50 may be formed (e.g., by machining) in the lower end 40 of the light pipe 22 to form the separate metallized end surfaces 46, 48.

Figure 12:
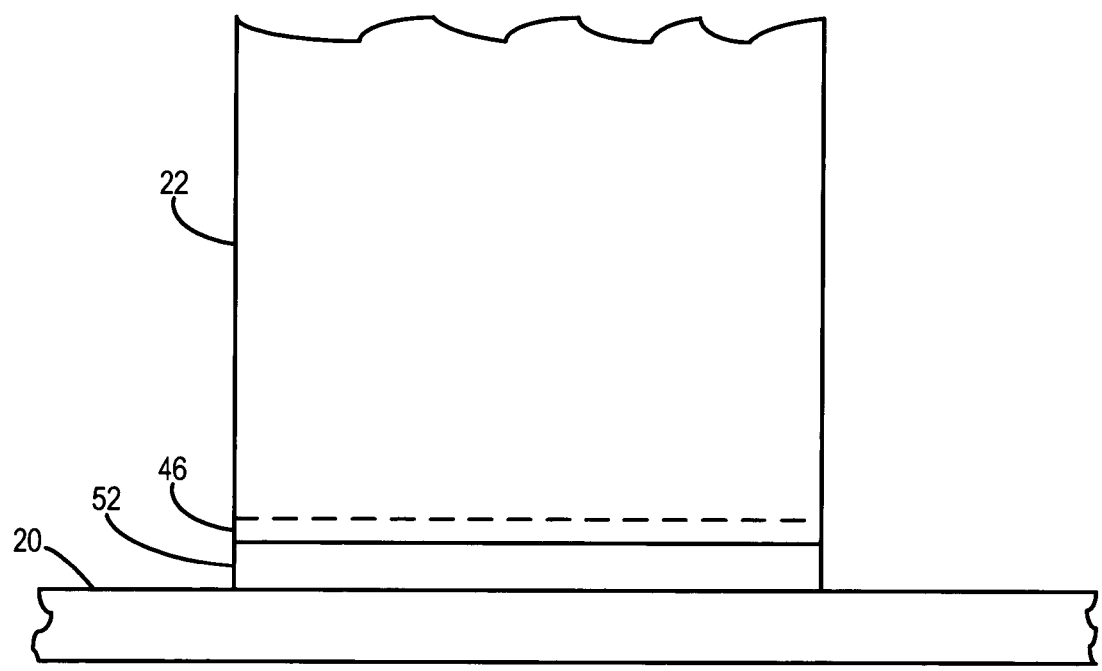
FIG. 12 is a schematic side view of one of the light pipes as it is mounted on the circuit board of FIG. 1.

The light pipe 22 is then available for mounting on the circuit board by soldering the metallized end surfaces 46, 48 to the circuit board 20. For example, at a suitable stage of assembly of the circuit board, the light pipe 22 is provided and is placed on the circuit board 20 with the metallized end surfaces 46, 48 on a solder pad (indicated by reference numeral 52 in FIG. 12) or pads on the circuit board 20. The solder pad 52 or pads are then re-flowed (e.g., by placing and cycling the circuit board 20 in a reflow oven) to solder the surfaces 46, 48 to the top surface of the circuit board 20.

At the time when the light pipe 22 is placed on the circuit board, an optical device 28 may previously have been mounted on the circuit board, and the light pipe may be placed on the circuit board in such a way that the optical device is received in the notch 50 of the light pipe. In this way, the optical device may be optically coupled to the light pipe. (As used in the appended claims, "inserting" an optical device into a notch in an end surface of a light pipe includes placing the end of the light pipe down upon the optical device so that the optical device is received in the notch in the end of the light pipe.) At a subsequent stage of assembly of the circuit board, or during assembly of an electronic device of which the circuit board is a part, an optical fiber (not shown) may be coupled to the end surface 44 of the outer end 42 of the light pipe.

In some embodiments, the lower end of the light pipe, and particularly the metallized end surface(s), may be configured differently than illustrated in FIGS. 2 and 3. FIGS. 4-8 are inverted plan views which show the lower end configurations of example alternative embodiments of the light pipe. In FIGS. 4-8, the darkly shaded areas represent metallized end surfaces by which the light pipes may be soldered to a circuit board or other substrate. The less darkly shaded areas represent recessed or notched regions of the lower end of the light pipe.

Figure 9:
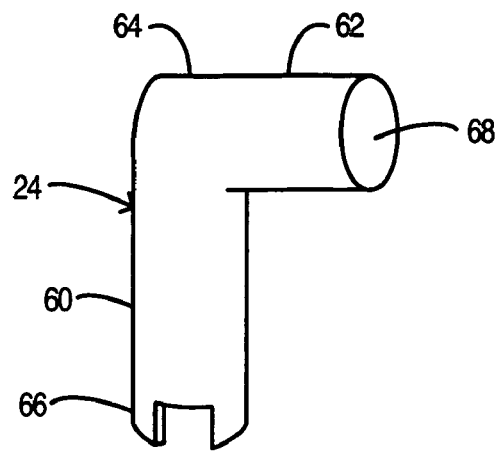
FIG. 9 is an isometric view of another one of the light pipes shown in FIG. 1.

FIG. 9 is an isometric view in isolation of the light pipe 24 shown in FIG. 1. Light pipe 24 is in the form of a plastic body which includes a generally cylindrical lower portion 60 and a generally cylindrical cross portion 62 joined to an upper end of the lower portion 60 at a right-angle 64. Light pipe 24 may be formed of any of the materials mentioned above in connection with light pipe 22.

The lower portion 60 of the light pipe 24 has a lower end 66 by which the light pipe 24 is to be mounted to the circuit board. The lower end 66 may have the same notch and the same metallized end surface configuration as described with respect to light pipe 22 (as seen in FIGS. 2 and 3) or as indicated by FIGS. 4-8. (Other configurations for the lower ends of light pipes 22, 24 are also possible.) The cross portion 62 may have, as seen in FIG. 9, a substantially circular end surface 68. Light emitted from an optical device coupled to the lower end 66 of the light pipe 24 may exit from the light pipe 24 via the end surface 68; alternatively, light which enters the light pipe 24 via the end surface 68 may be received by an optical device coupled to the lower end 66 of the light pipe 24.

Metallization of lower end surface(s) of the light pipe 24 may be performed in the same manner as described above in connection with light pipe 22. Also, the light pipe 24 may be mounted on the circuit board in the same manner as the light pipe 22, including optically coupling the lower end of the light pipe 24 to a respective optical device mounted on the circuit board. It will also be appreciated that an optical fiber (not shown) may be coupled to the end surface 68 of the light pipe 24.

Figure 10:
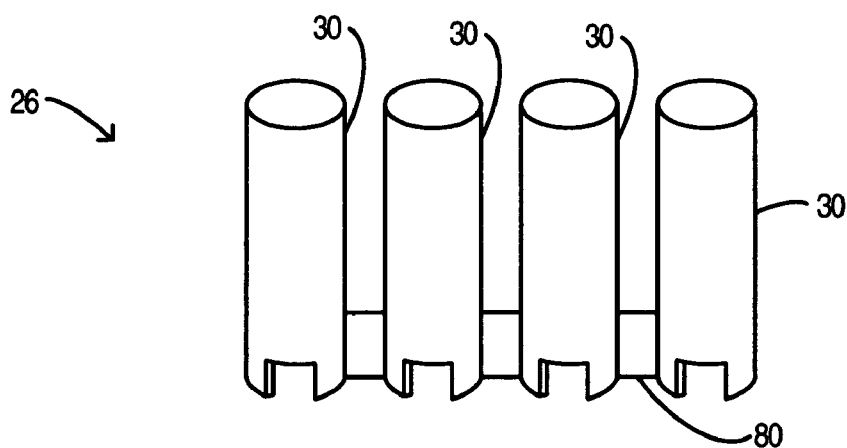
FIG. 10 is an isometric view of a light pipe assembly shown in FIG. 1.

FIG. 10 is an isometric view in isolation of the light pipe assembly 26 shown in FIG. 1. The light pipe assembly 26 is in the form of a 1×4 array of light pipes 30. Each light pipe 30 may have essentially the same configuration as light pipe 22, as described above. In addition, the light pipe assembly 26 includes a support member 80 that joins the light pipes 30 together so that the light pipes 30 are substantially parallel to each other. The support member 80 may be integrally formed with lower ends of the light pipes 30. The entire light pipe assembly 26 may be formed of any of the materials described above in connection with the light pipe 22.

Figure 11:
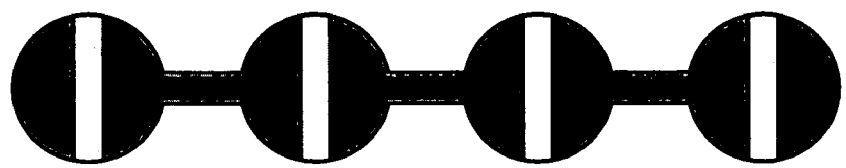
FIG. 11 is an inverted plan view of the light pipe assembly of FIG. 10.

FIG. 11 is an inverted plan view showing lower end surfaces of the light pipe assembly 26. Each light pipe 30 of the light pipe assembly 26 may include two metallized end surfaces separated by a notch formed in the light pipe. In addition, the bottom surface of the support member 80 may be metallized. The metal finish of the metallized surfaces of the light pipe assembly may be one of the types of metal finishes described above in connection with light pipe 22. From previous discussion, it will be appreciated that the metal finish may be deposited on the bottom surface of the light pipe assembly in the same manner as described above in connection with light pipe 22, and that the notches in the lower ends of the light pipes 30 may be formed after metallization.

The light pipe assembly may be mounted by soldering on the circuit board in the same manner as described above in connection with light pipe 22. When the light pipe assembly is mounted on the circuit board, this may be done in such a way that each of the light pipes 30 is coupled to a respective optical device previously mounted on the circuit board. Also, a respective optical fiber (not shown) may be coupled to each light pipe 30 of the light pipe assembly at an appropriate stage of assembly of the circuit board or of an electronic device of which the circuit board is a part.

It should be understood that instead of the 1×4 array of light pipes shown in FIG. 10, a light pipe assembly according to some embodiments may include a light pipe array of different dimensions from 1×4. Generally, the light pipe array included in the light pipe assembly may have dimensions n×m, with n and m both being positive integers, and at least one of n and m being greater than one.

Mounting light pipes and/or light pipe assemblies on a circuit board with SMT may facilitate use of high speed optical signaling between components on the circuit board or between the circuit board and other boards or components, while providing a satisfactory mechanical attachment of the light pipes/light pipe assemblies to the circuit board. With this mounting technique, there is no need to drill or otherwise form a hole in the circuit board substrate, and there is no interference with or disruption of signal traces, power or ground planes on the circuit board or in layers within the circuit board. Further, this mounting technique may use the limited space on the circuit board more efficiently than other mounting techniques. Moreover, since surface mounting does not interfere with trace routing, layout of the board may be simplified. Still further, surface mounting of light pipes/light pipe assemblies may be well-suited for high volume manufacturing (HVM) applications. Consequently, surface mounting may lead to cost effective use of light pipes on circuit boards. In addition, the metallized surfaces on the light pipes may function to carry electrical signals as well as allowing the light pipes to be mechanically joined to the circuit board.

In embodiments described above, light pipes are optically coupled to optical devices mounted on the same side of the circuit board as the light pipes. However, in other embodiments, light pipes may be optically coupled to optical devices mounted on the other side of the circuit board, with via holes provided through the board itself to allow light to pass between the optical devices and the light pipes to which the optical devices are coupled.

In some embodiments, light pipes are surface mounted to substrates other than circuit boards. For example, in some embodiments a light pipe may be surface mounted on a package for an integrated circuit (IC) or on a silicon or other semiconductor substrate in or on which an optical device is formed. Thus, as used herein and in the appended claims, "substrate" includes, but is not limited to, a circuit board, an IC package substrate or a semiconductor substrate.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
providing a light pipe having a metallized end surface and a notch formed in the end surface;
mounting an optical device on a surface of a circuit board;
inserting the optical device into the notch in the end surface of the light pipe to optically couple the light pipe to the optical device; and
soldering the metallized end surface of the light pipe to the surface of the circuit board.

2. The method of claim 1, wherein the light pipe has an outer end opposite to the metallized end surface, the method further comprising:

coupling an optical fiber to the outer end of the light pipe.

3. An apparatus comprising:

a circuit board; and a light pipe mounted on the circuit board by soldering on a metallized surface of the light pipe, said metallized surface at an end of the light pipe, said end of the light pipe having a notch formed therein; and an optical device mounted on the circuit board and optically coupled to the light pipe, the optical device inserted in the notch formed in the end of the light pipe.

4. The apparatus of claim 3, wherein said end of the light pipe is a first end of the light pipe, the light pipe also having a second end, the apparatus further comprising:

an optical fiber coupled to the second end of the light pipe.

5. The apparatus of claim 3, wherein the metallized surface conducts an electrical signal.

6. An apparatus comprising:

a circuit board; and a light pipe assembly which includes an n×m array of light pipes, n and m being positive integers, at least one of n and m being greater than one, the light pipe assembly further including at least one member joining the light pipes together so that the light pipes are parallel to each other, each of the light pipes having two metallized surfaces soldered to the circuit board, the two respective metallized surfaces of each light pipe being separated from each other by a respective notch in an end of said each light pipe; and an array of optical devices mounted on the circuit board and each optically coupled to a respective one of the light pipes, each of the optical devices inserted in the respective notch in the end of the respective one of the light pipes.

7. The apparatus of claim 6, wherein the metallized surface conducts an electrical signal.

* * * * *